US010643467B2

(12) United States Patent
Alon

(10) Patent No.: US 10,643,467 B2
(45) Date of Patent: May 5, 2020

(54) SYSTEM AND METHOD FOR DETECTING AND RECORDING TRAFFIC LAW VIOLATION EVENTS

(75) Inventor: Yaniv Alon, Jerusalem (IL)

(73) Assignee: Roadmetric Ltd., Jerusalem (IL)

( * ) Notice: Subject to any disclaimer, the term of this patent is extended or adjusted under 35 U.S.C. 154(b) by 1382 days.

(21) Appl. No.: 12/748,416

(22) Filed: Mar. 28, 2010

(65) Prior Publication Data

US 2011/0234749 A1 Sep. 29, 2011

(51) Int. Cl.

*H04N 7/00* (2011.01)
*H04N 7/18* (2006.01)
*G08G 1/054* (2006.01)
*G07C 5/08* (2006.01)

(52) U.S. Cl.

CPC .......... *G08G 1/054* (2013.01); *G07C 5/0866* (2013.01)

(58) Field of Classification Search

CPC ........ G07C 5/0866; G08G 1/054; B60R 1/00; B60R 2300/105; B60R 2300/302; B60R 2300/303; B60R 2300/607; G03B 37/04; G06T 15/205; G06T 19/00; G06T 2207/30252; G06T 3/4038; H04N 7/183; H04N 7/188; H04W 52/0258

USPC .......................................................... 348/36

See application file for complete search history.

(56) References Cited

U.S. PATENT DOCUMENTS 5,948,038 A * 9/1999 Daly et al. .................... 701/117
5,959,555 A * 9/1999 Furuta ...................... B60R 1/00 340/436
6,914,541 B1 * 7/2005 Zierden ......................... 340/937
7,164,118 B2 1/2007 Anderson et al.
7,362,215 B2 * 4/2008 Janssen .................... 340/426.25
2002/0186297 A1 * 12/2002 Bakewell ............. G08G 1/0175 348/118
2004/0252193 A1 * 12/2004 Higgins ............... G08G 1/0175 348/149
2006/0269104 A1 * 11/2006 Ciolli ........................... 382/104
2006/0269105 A1 11/2006 Langlinais
2007/0200933 A1 * 8/2007 Watanabe ........ G08B 13/19643 348/211.11
2007/0223900 A1 * 9/2007 Kobayashi ......... H04N 5/23232 396/50
2007/0229238 A1 * 10/2007 Boyles .............. G06K 9/00369 340/435

(Continued)

FOREIGN PATENT DOCUMENTS

WO 2011121498 A1 10/2011

OTHER PUBLICATIONS

Lawrence J. Blincoe "The Economic Cost of Motor Vehicle Crashes 1994", U.S. Department of Transportation, National Highway Traffic Safety Administration, pp. 1-69 (1994).

(Continued)

*Primary Examiner* — Jessica M Prince

(74) *Attorney, Agent, or Firm* — Dr. Hanan Farber Patent Agent Ltd

(57) ABSTRACT

A system for detecting and recording real-time law violations having an array of wide and narrow angled cameras providing a plurality of images of a substantially 360° field of view around a law enforcement unit, a recording unit for recording said images, an analyzing unit for detecting a law violation, a permanent storage unit for permanently storing a plurality of images of a law violation event and a reporting unit for issuing citations.

18 Claims, 13 Drawing Sheets

(56) References Cited

U.S. PATENT DOCUMENTS

| | | | | |
|---|---|---|---|---|
| 2007/0285282 | A1* | 12/2007 | Nakayama | B60R 1/00<br>340/937 |
| 2008/0048886 | A1* | 2/2008 | Brown | G08G 1/0175<br>340/937 |
| 2008/0122597 | A1* | 5/2008 | Englander | B60Q 1/24<br>340/433 |
| 2008/0165018 | A1 | 7/2008 | Breed | |
| 2008/0186382 | A1* | 8/2008 | Tauchi | G01S 13/89<br>348/148 |
| 2009/0079553 | A1* | 3/2009 | Yanagi | B60R 1/00<br>340/435 |
| 2009/0102921 | A1* | 4/2009 | Ito | B60R 1/00<br>348/148 |
| 2010/0033677 | A1* | 2/2010 | Jelinek | G06K 9/00604<br>351/208 |
| 2010/0128127 | A1* | 5/2010 | Ciolli | 348/143 |
| 2010/0134325 | A1* | 6/2010 | Gomi | B60R 1/00<br>340/995.14 |
| 2010/0149334 | A1* | 6/2010 | Wirsz | G08G 1/0175<br>348/143 |

OTHER PUBLICATIONS

Written opinion of the International Searching Authority, dated Aug. 12, 2011, PCT/IB2011/051249.
International search report, PCT/IB2011/051249, dated Aug. 12, 2011.
Examination Report, Israel Patent Office, App No. 222135, dated Mar. 8, 2016.

* cited by examiner

SYSTEM AND METHOD FOR DETECTING AND RECORDING TRAFFIC LAW VIOLATION EVENTS

FIELD OF THE INVENTION

The present invention relates to a traffic violation processing systems and more particularly, the present invention is directed to a system and method for detecting and recording traffic Law violation events and storing one or more digitized images and other available data, such as speed, location, time, etc, to provide evidentiary records for traffic violation enforcement purposes.

BACKGROUND OF THE INVENTION AND PRIOR ART

Traffic law violators are known to be a major cause for traffic automotive accidents, which are a major cause of loss of life and property. It is estimated that over ten million people are involved in traffic accidents annually worldwide and that of this number, about three million people are severely injured and about four hundred thousand are killed. A report "The Economic Cost of Motor Vehicle Crashes 1994" by Lawrence J. Blincoe published by the United States National Highway Traffic Safety Administration estimates that motor vehicle crashes in the U.S. in 1994 caused about 5.2 million nonfatal injuries, 40,000 fatal injuries and generated a total economic cost of about $150 billion.

Various attempts have been made to improve traffic law enforcement. An example of a laser based system, is disclosed in U.S. Pat. No. 7,164,118 (hereinafter U.S. Pat. No. '118), by Anderson et al. U.S. Pat. No. '118 discloses a method of detecting presence of an object and the distance between the system and an object using a laser mounted on an industrial vehicle. The transmitter emits linear beams of electromagnetic radiation with a transmitted radiation pattern within a defined spatial zone. A camera collects an image of the defined spatial zone. A data processor detects a presence of an object in the collected image based on an observed illumination radiation pattern on an object formed by at least one of the linear beams. A distance estimator estimates a distance between the object and the optical device.

There are also prior art systems using imaging devices to image the scene in an angle 360° horizontally around a vehicle. Such a system is disclosed in U.S. patent application 2004/0075544 (hereinafter US '544), by Janssen Holger. US '544 uses two optical sensors that act as a pair of stereo cameras. The sensors are coupled with fisheye lenses, which have a very wide-angle of 220°. Thus, a large portion of the surroundings of the motor vehicle may be detected but the very wide-angle lenses provide images with a large extend of distortion, and US '544 does not disclose if the distortion is corrected. In US '544 all sensors emit the sensed information to a single controller. US '544 suffers from a tradeoff between covering large field of view and achieving detailed images of distant objects. Employing very high resolution cameras incurs a significantly high added expense. The same is true for other known 360° degree systems.

It would be desirable to provide an automated traffic violation monitoring system and method for tracking, identifying and recording traffic violations in a 360° field of view around the system. It would also be desirable to provide such a system and method that achieves detailed images of distant objects without the added bandwidth and expenses of very high resolution cameras. It would also be desirable to provide such a system and method that uses GPS location technology to provide comprehensive violation data as evidentiary records for traffic violation enforcement. It would also be desirable to provide a side-ways looking system to improve traffic violation detection and provide improved evidentiary records of traffic violations. Side looking cameras improve position estimation along the longitude axes which provides a more accurate assessment of the distance between vehicles. In addition, side looking cameras improve the ability and efficiency of tracking a vehicle moving between various fields of view, while maintaining a positive identification of the vehicle and an improved ability to assess a traffic violation such as passing on the wrong side.

Thus, there is a need for and it would be advantageous to have a system including multiple cameras mounted on a law enforcement vehicle or concealed therein, having side looking cameras, for automatically detecting and recording in real time traffic law violation events in a manner so as to provide evidentiary records for traffic violation enforcement purposes.

The term "Field Of View" (FOV) in general is the angular extent of a given scene, delineated by the angle of a three dimensional cone that is imaged onto an image sensor of a camera, the camera being the vertex of the three dimensional cone. The FOV of a camera is determined by the focal length of the lens: the longer the focal length, the narrower the field of view. The terms "Field Of View" of a camera and "viewing zone" of a camera are used herein interchangeably and are used herein to refer to the horizontal angular extent of a given scene, as imaged on to the image sensor of the camera. It is assumed that the dimensions of the detector are adapted to the camera FOV. The term "wide angle camera" in this documents refers to cameras with a FOV that is relatively wider then those of "narrow angle camera"

The term "an angle 360° around a vehicle" as used herein refers to the combined viewing zone as viewed by all wide FOV cameras. The combined viewing zone as viewed by all wide FOV cameras is not necessarily continuous, and there can be "blind" gaps between the viewing zones of two adjacent wide FOV cameras. FIG. 4 is an example of a top view of an embodiment of a traffic law violation detection and recording system 100 of the present invention, configured with a host vehicle 10 and four wide angle cameras. Viewing zones 52 viewed by the left and right looking cameras 50*b* and 50*c* are considerably wider than the front and back looking cameras 50*a* and 50*d*, and wherein each viewing zone 52 is separated from a neighboring viewing zone 52 by a diverging blind gap/zone 53. The four wide angle cameras are said to monitor "an angle 360° around the vehicle".

The term "primary relative directions" is used within the scope of this application to refer to the relative directions of forwards, backwards, to the left and to the right.

SUMMARY OF THE INVENTION

According to the present invention there is provided a system for detecting and recording real-time law violations, the system including: (a) an array of cameras providing a plurality of images of a substantially 360° field of view around a law enforcement unit; (b) a recording unit for recording the plurality of images from the array of cameras; and (c) an analyzing unit for analyzing the plurality of images so as to detect a law violation event.

According to further features in preferred embodiments of the invention described below, the array of cameras includes: (i) at least 4 wide angled cameras positioned to view primary relative directions and provide a substantially 360° field of view for detecting an object within the field of view; and (ii) at least one narrow angled camera operable to rotate in order to provide a plurality of close up images of at least one identification feature of the detected object, where the detected object is a vehicle or person and the identification feature is a license place, face, vehicle model and vehicle color.

According to still further features in the described preferred embodiments the system further includes (d) a permanent storage unit for permanently storing a plurality of images identified by the analyzing unit as representing a law violation event.

According to still further features in the described preferred embodiments the law enforcement unit is a permanently fixed unit, a vehicular unit or a transportable unit. According to still further features in the described preferred embodiments the recording unit is further configured to record data, for use as evidentiary material such as current speed of the law enforcement unit, the geographical location, current date and current time.

According to still further features in the described preferred embodiments the system further includes (e) a reporting unit, which is operable to report the detected law violation, and can be either a local citation issuing unit or a remote citation issuing unit.

According to still further features in the described preferred embodiments the wide angled cameras are fixedly mounted on the law enforcement unit or fixedly mounted in the law enforcement unit.

According to another embodiment there is provided a method for recognition of a law violation including the steps of: (a) acquiring a plurality of images; (b) recognizing a law violation by comparing a set of features from the plurality of images with a set of predefined rules for a law violation; and (c) issuing a citation.

According to further features in preferred embodiments of the invention described below, the method includes a further step of (d) storing a set of identification features of a law violating object from the plurality of images for identification of said violating object. According to still further features in the described preferred embodiments the law violating object is a vehicle. According to still further features in the described preferred embodiments the law violating object is a person. According to still further features in the described preferred embodiments the set of identification features can be a license plate, a vehicle model, a vehicle color or a face.

According to still further features in the described preferred embodiments the law violation can be: an illegal changing of lanes such as crossing a solid line or changing lanes without prior indication of a turn signal. According to still further features in the described preferred embodiments the citation can be issued by a local citation unit or a remote citation unit.

According to the present invention there is provided a mechanism including: (a) at least one wide-angled camera for providing a plurality of images; (b) a processor for processing the plurality of images so as to determine a region of interest; and (c) at least one narrow angled camera operationally coupled to the processor operable to rotate in order to provide a plurality of higher quality images of the determined region of interest. According to further features of the described embodiment the wide angle camera is further configured to provide a wide angled image for every narrow angled image at substantially the same time, with a potential time delay of but not limited to, 20 milliseconds.

The present invention discloses an improved system and method for detecting in real time traffic law violation events, preferably in an angle 360° around the host vehicle.

The traffic law violation detection and recording system and methods detect target vehicles in a series of image frames obtained from one or more cameras and records video and relevant data to provide evidentiary records for traffic violation event. The recorded video of a traffic law violation event typically includes several seconds before the traffic law violation event and a few seconds after the conclusion of the traffic law violation event. The relevant data may include the host vehicle speed, geographical location, time, close-up image of ID object, or any other relevant data.

The traffic law violation detection and recording system includes a multiple number of cameras, each with a wide angle lens, that combine to encompass the scene around the vehicle. Each wide angle camera FOV is, preferably, tangential to the FOV of the next neighboring wide angle camera, but may have some overlap with the FOV of the next neighboring wide angle camera or may have a blind gap with the FOV of the next neighboring wide angle camera. The traffic law violation detection and recording system further includes at least one and preferably two narrow angle cameras to record close-up images of one or more identification (ID) features of a detected traffic violation vehicle. The ID objects can be the detected vehicle, the license plate of the detected vehicle, the driver of the detected vehicle and/or any other evidentiary object. The narrow angle cameras can typically move in the PAN direction or PAN and TILT directions, such that they can be quickly aimed to acquire a close-up image of a selected. ID object.

According to the present invention there is provided a method for detecting and recording in real time a traffic law violation event, by a traffic law violation detection and recording system mounted on a host vehicle, according to embodiments of the present invention. When the traffic law violation detection and recording system is operated, the system starts monitoring the scene in an angle 360° horizontally around the host vehicle using N wide angle cameras. Typically, the system also acquires available relevant data, such as the speed of the host vehicle, the geographical location of the host vehicle, the time and day and other available relevant data. The system continuously records video image frames from N cameras into a temporary memory, keeping video back for a predetermined amount of time, dependent on the memory size and predefined buffer size selection.

Upon the entering of a target vehicle (or any other object such as, but not limited to, a person) into a zone viewed by a wide angle camera, the target vehicle is detected automatically by system processor. The behavior of the target vehicle is then analyzed either automatically by system processor, or manually by the operator of the system. The system also detects identifying objects of the target such as the target vehicle, the license plate of the target vehicle, the driver of the target vehicle etc. A narrow angle camera is then directed to each detected identification object and the acquired image frames from the narrow angle camera are then recorded in a temporary memory. When a traffic law violation event is detected, all the recorded video, images of identification objects, ID objects images, and other relevant data is saved to document the detected traffic violation event including video that was kept in temporary memory, for future use, for example, for issuing and handling a citation or as evidence for the occurrence of traffic violation event. The system or another system may then issue a traffic citation based on the traffic violation event data obtained and recorded.

In an optional embodiment, optical recognition software can be used to convert the image of the license plate into an equivalent alpha-numeric digital format. The license plate number can then be automatically checked for outstanding violations such as unpaid parking tickets or that the car has been reported as stolen. In this manner, the law enforcement vehicle servers as a mobile unit for additional vehicle related violations, not only current traffic violations.

BRIEF DESCRIPTION OF THE DRAWINGS

The present invention will become fully understood from the detailed description given herein below and the accompanying drawings, which are given by way of illustration and example only and thus not limitative of the present invention.

DETAILED DESCRIPTION OF THE INVENTION

Figure 1:
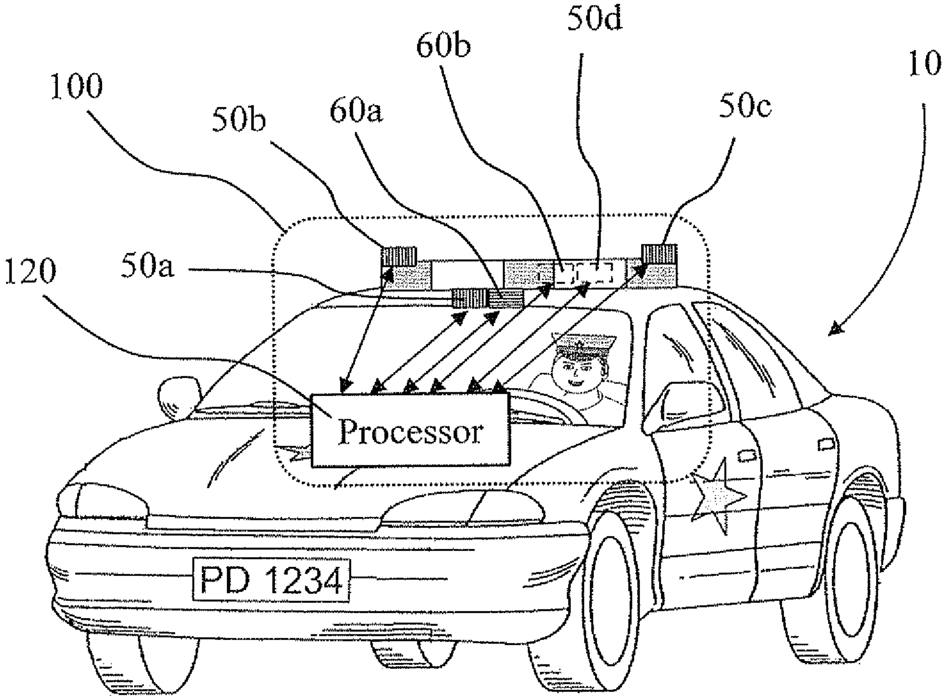
FIG. 1 is a perspective view of an embodiment of a traffic law violation detection and recording system, according to embodiments of the present invention, configured with a law enforcement host vehicle.

The present invention is of a system mounted on, or inside, a host vehicle, typically a law enforcement vehicle, and methods for detecting in real time traffic law violators around the host vehicle and recording evidence of traffic low violations. The traffic law violation detection and recording system includes multiple wide angle cameras that combine to encompass the scene around the host vehicle, and at least one narrow angle camera to record close-up images of one or more identification (ID) objects of a detected traffic violation vehicle. The traffic law violation detection and recording system and methods detect target vehicles in a series of image frames obtained from one or more cameras and records video and or relevant data to provide evidentiary records for traffic violation event.

The principles and operation of a system and method for detecting in real time traffic law violators around the host vehicle, in a series of images obtained from a series of cameras mounted on a host law enforcement vehicle to provide evidentiary records for traffic violation event, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, a principal intention of the present invention is to provide a system and method for detecting in real time traffic law violators, preferably in an angle 360° around the host vehicle. The traffic law violation detection and recording system includes a multiple number of cameras, each with a wide angle lens, that combine to encompass the scene around the vehicle. Each wide angle camera FOV is, preferably, tangential to the FOV of the next neighboring wide angle camera, but may have some overlap with the FOV of the next neighboring wide angle camera or may have a blind gap with the FOV of the next neighboring wide angle camera. The traffic law violation detection and recording system may further include one and preferably two narrow angle cameras to record close-up images of one or more identification (ID) objects of a detected traffic violation vehicle. The ID objects can be the detected vehicle, the license plate of the detected vehicle, the driver of the detected vehicle and/or any other evidentiary object. A region in an image frame containing one or more ID objects is referred to as a region of interest (ROI). A narrow angle camera operable to rotate substantially 360° so as to narrowly focus on the ID objects The traffic law violation event detection and recording system and methods detect target vehicles in a series of image frames obtained from one or more cameras and records video and relevant data to provide evidentiary records for traffic violation event. The relevant data may include images of ID object, the host vehicle speed, geographical location, time or any other relevant data. The detection of a traffic law violating target vehicle can be performed automatically by the processor of the traffic law violation detection and recording system, and/or manually, by a system operator.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Referring now to the drawings, FIG. 1 is a perspective view of an embodiment of a traffic law violation detection and recording system 100, according to embodiments of the present invention, configured with a law enforcement host vehicle 10, four wide angle camera units 50 generally viewing the scene in an angle 360° horizontally around the vehicle, and two narrow angle camera units 60 for recording close-up images of ROIs of a target vehicle. It is understood that the camera array can be mounted on the inside of the host vehicle, so as to provide an improved line-of-sight and at the same time, to conceal the existence of the detection system. The number of cameras is given by way of example only, and the total number of cameras may vary depending on the application as needed. The law enforcement host vehicle is given by way of example only, as the imaging array may be mounted on a bi-cycled vehicle, a stationary unit, a transportable mobile unit or other configuration obvious to those skilled in the art. Traffic law violation detection and recording system 100 also includes a processor 120 for controlling the cameras (50 and 60), acquiring the images, detecting and recording traffic violation events data including video images, before, during and after a traffic violation event, and available relevant data such the speed of host vehicle 10 (for example from the CAN bus of host vehicle 10), geographical location and time (for example from a GPS), and other available relevant data.

Figure 2:
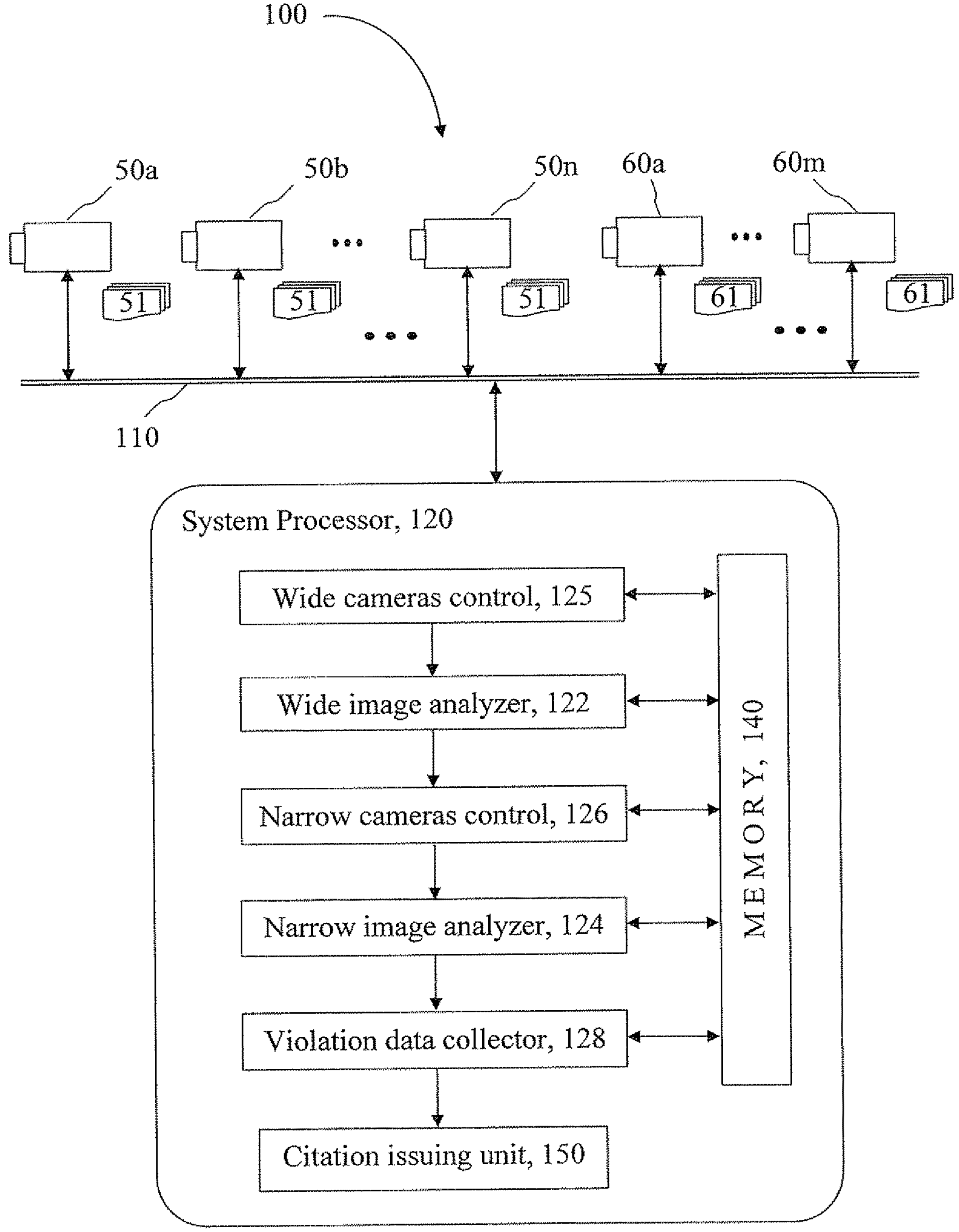
FIG. 2 is a schematic illustration of a traffic law violation detection and recording system having N wide angle cameras and M narrow angle cameras, according to embodiments of the present invention.

Referring now to FIG. 2, a schematic illustration of a traffic law violation detection and recording system 100 having N wide angle cameras 50 and M narrow angle cameras 60, according to embodiments of the present invention, is shown. System 100 also includes a processor 120. Each camera unit (50 and 60) includes an image sensor (for instance, CMOS or CCD sensor). Image frames (51 and 61) are captured respectively by cameras (50 and 60). Processor 120 processes image frames (51 and 61) to detect and record traffic law violation events. Control unit 125 of processor 120 operationally controls cameras 50 to continuously acquire and store video images in memory 140, and control unit 126 of processor 120 operationally controls cameras 60 to aim to a ROI, acquire and store video images of the ROI in memory 140. Violation data controller 128 of processor 120 collects available relevant data such as the speed of host vehicle 10, geographical location, time and other available relevant data and stores the collected data in memory 140. All N+M camera units (50 and 60) can communicate with system processor 120.

In embodiments of the present invention, traffic law violation detection and recording system 100 automatically detects traffic law violation events using analyzer 122. Analyzer 122 automatically detects vehicles as they enter the FOV. In embodiments of the present invention, cameras control 126 aims narrow cameras 60 towards ROI of detected vehicles. In embodiments of the present invention, traffic law violation detection and recording system 100 automatically analyzes images of ROI to identify the traffic law violator, using analyzer 124.

Processor 120 either issues a citation using citation issuing unit 150 or provides the collected data to another processing unit or operator to take action against the traffic law violator.

Methods according to different embodiments of the present invention analyze in real time image frames 51, using processor 120 to detect target vehicles or pedestrians in image frames 51 and analyze the behavior of the detected target vehicles or pedestrians to see if a traffic law is violated. Processor 120 is a general purpose microprocessor, a processor implemented using digital signal processing (DSP) or an application specific integrated circuit (ASIC) or a combination of the different technologies.

It should be noted that a one time calibration procedure is performed when the cameras 50 and 60 are installed on vehicle 10. From a one time calibration procedure, the position of each camera in host vehicle 10 and the azimuth each camera optical axis relative to the longitudinal axis of vehicle 10 is measured and stored in processor 120.

Multiple Camera Configurations Examples

Figure 3:
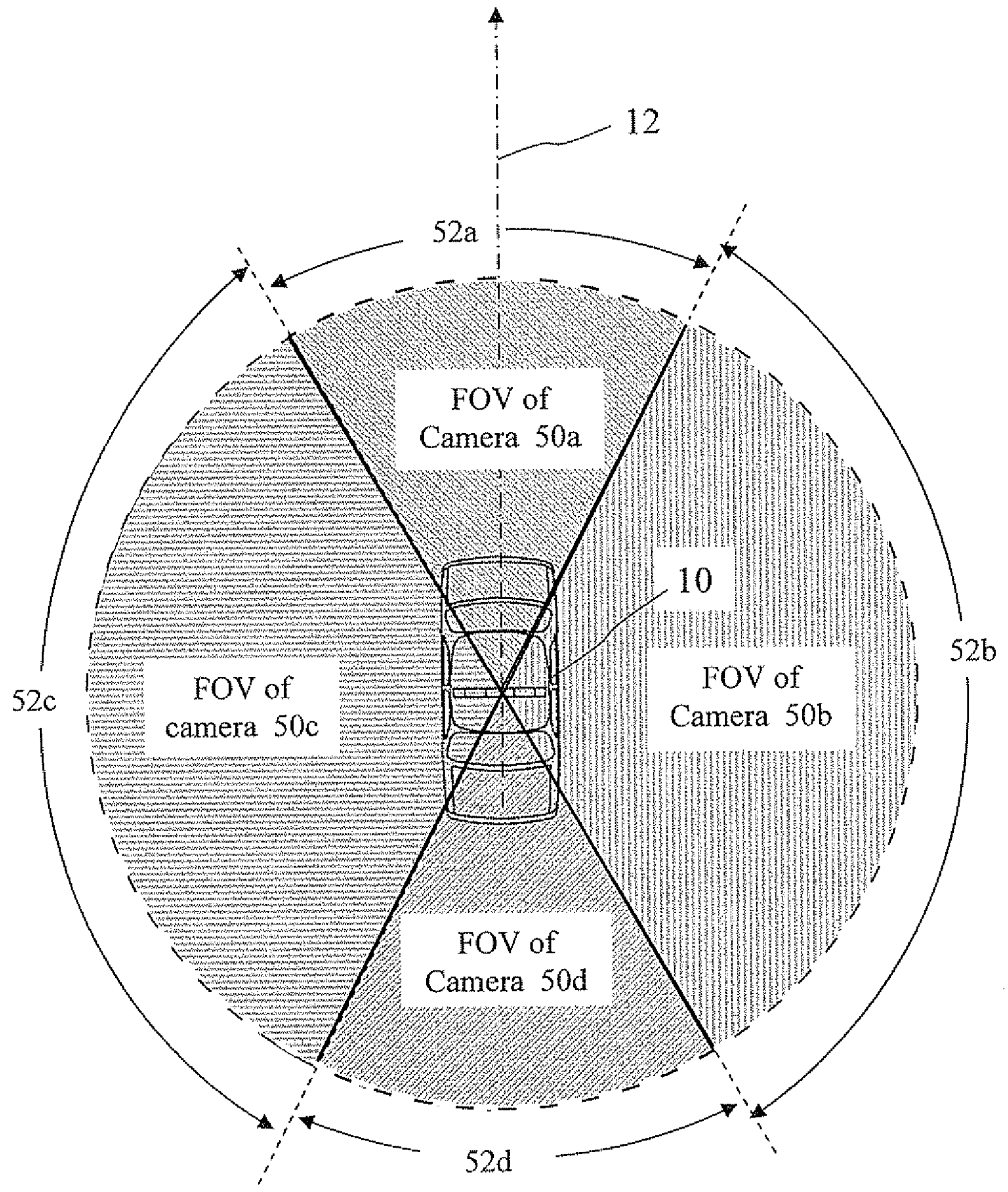
FIG. 3 is a top view illustration of an exemplary embodiment of a traffic law violation detection and recording system of the present invention, configured with a law enforcement host vehicle and four wide angle cameras in a concentric configuration with substantially tangential neighboring viewing zones.

Referring now to FIG. 3, a top view of an embodiment of a traffic law violation detection and recording system 100 of the present invention, configured with a law enforcement host vehicle 10, system 100 having four wide angle cameras 50 in a concentric configuration, is shown. Viewing zones 52 viewed by the left and right looking cameras 50*b* and 50*c* are considerably wider than the front and back looking cameras 50*a* and 50*d*, and wherein each viewing zone 52 is substantially tangential to a neighboring viewing zone 52. The front and back looking cameras 50*a* and 50*d* have a narrower FOV in order to be able to detect a target vehicle from a longer distance. In the embodiment illustrated in FIG. 3, FOVs 52 are combined to encompass 360° horizontally around vehicle 10 with generally no overlap between adjacent FOVs. If, for example, cameras 50*a* and 50*d* have a FOV=60°, cameras 50*a* and 50*d* have a FOV=120°.

Figure 4:
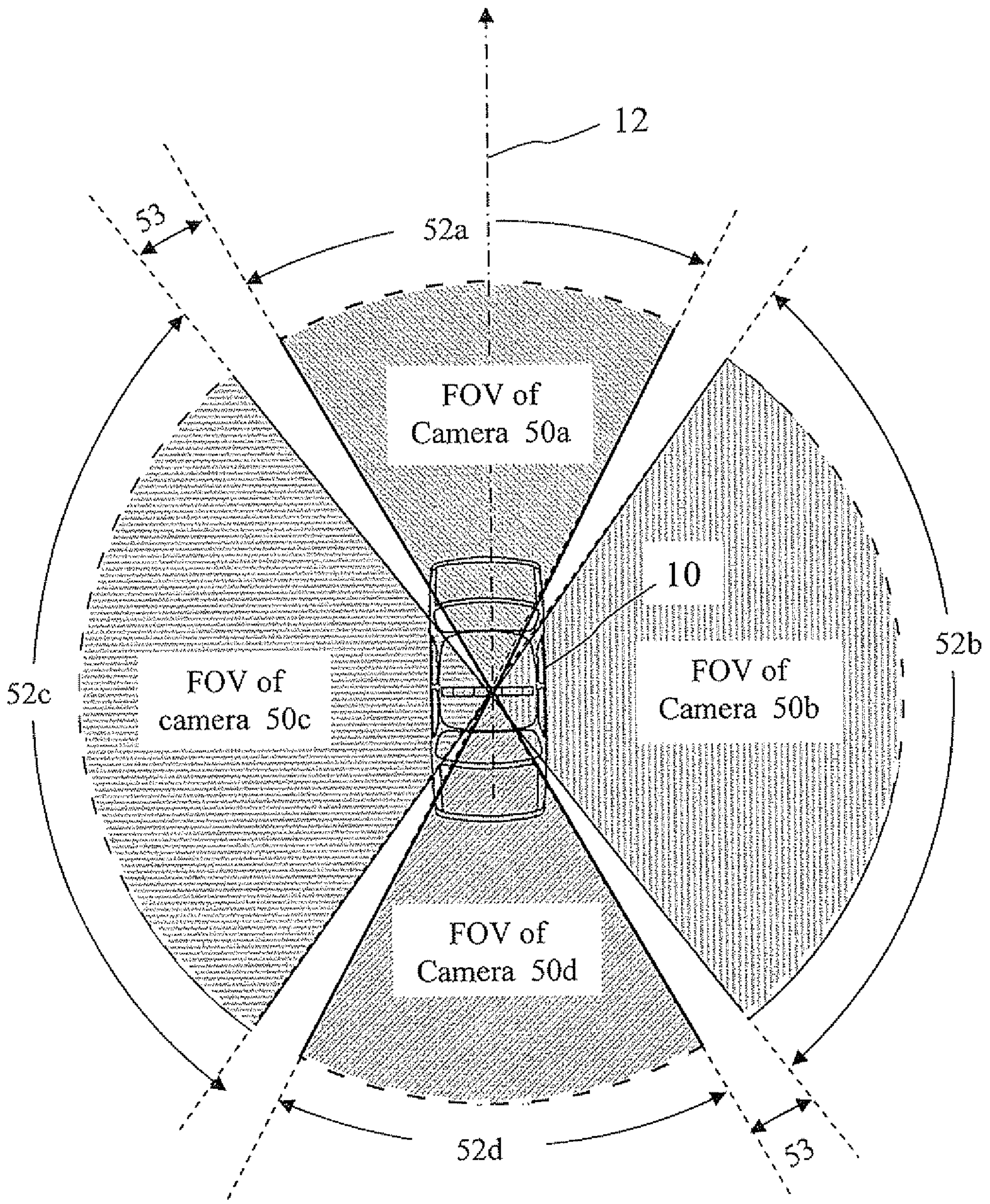
FIG. 4 is a top view illustration of an exemplary embodiment of a traffic law violation detection and recording system of the present invention, configured with a law enforcement host vehicle and four wide angle cameras in a concentric configuration, with diverging blind zones.

Referring now to FIG. 4, a top view of an embodiment of a traffic law violation detection and recording system 100 of the present invention, configured with a law enforcement host vehicle 10 and four wide angle cameras in a concentric configuration, is shown. Viewing zones 52 viewed by the left and right looking cameras 50*b* and 50*c* are considerably wider than the front and back looking cameras 50*a* and 50*d*, and wherein each viewing zone 52 is separated from a neighboring viewing zone 52 by a diverging blind zone 53.

Figure 5:
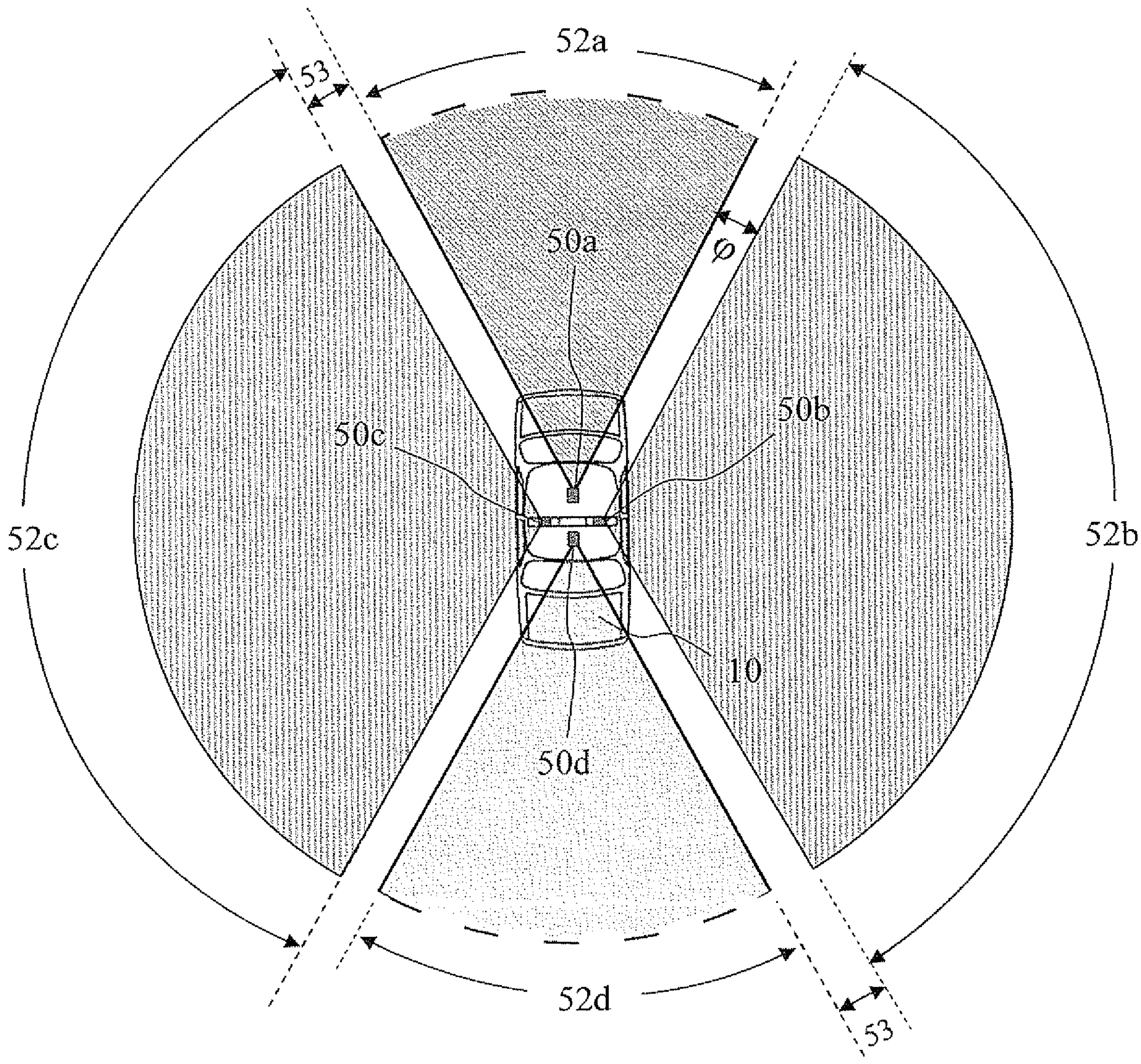
FIG. 5 is a top view illustration of an exemplary embodiment of a traffic law violation detection and recording system of the present invention configured with a law enforcement host vehicle and a four wide angle cameras in a non-concentric configuration, with non-diverging blind zones.

Placing N cameras in a concentric configuration is often not practical on a law enforcement host vehicle 10. Often, system 100 is installed on a concealed law enforcement vehicle 10 and in other cases on a regular vehicle. In such, cases, at least a portion of cameras 50 and 60 are placed inside vehicle 10. Cameras 50*a* and 60*a* are typically placed behind the windshield (typically near the rear view mirror), cameras 50*d* and 60*b* are typically placed behind the rear window, camera 50*b* is typically placed behind the rear right window and camera 50*c* is typically placed behind the rear left window. Hence, the cameras are often placed in a non-concentric configuration. FIG. 5 is a top view of an embodiment of a traffic law violation detection and recording system 100 of the present invention configured with a law enforcement host vehicle 10 and a four wide angle cameras 50 in a non-concentric configuration. The FOV of the left and right looking cameras 50*b* and 50*c* are considerably wider than the front and back looking cameras and each viewing zone 52 is separated from a neighboring viewing zone 52 by a non-diverging blind zone 53, which are typically narrow and thus typically enables to detect a target vehicle by at least one camera 50.

Figure 6:
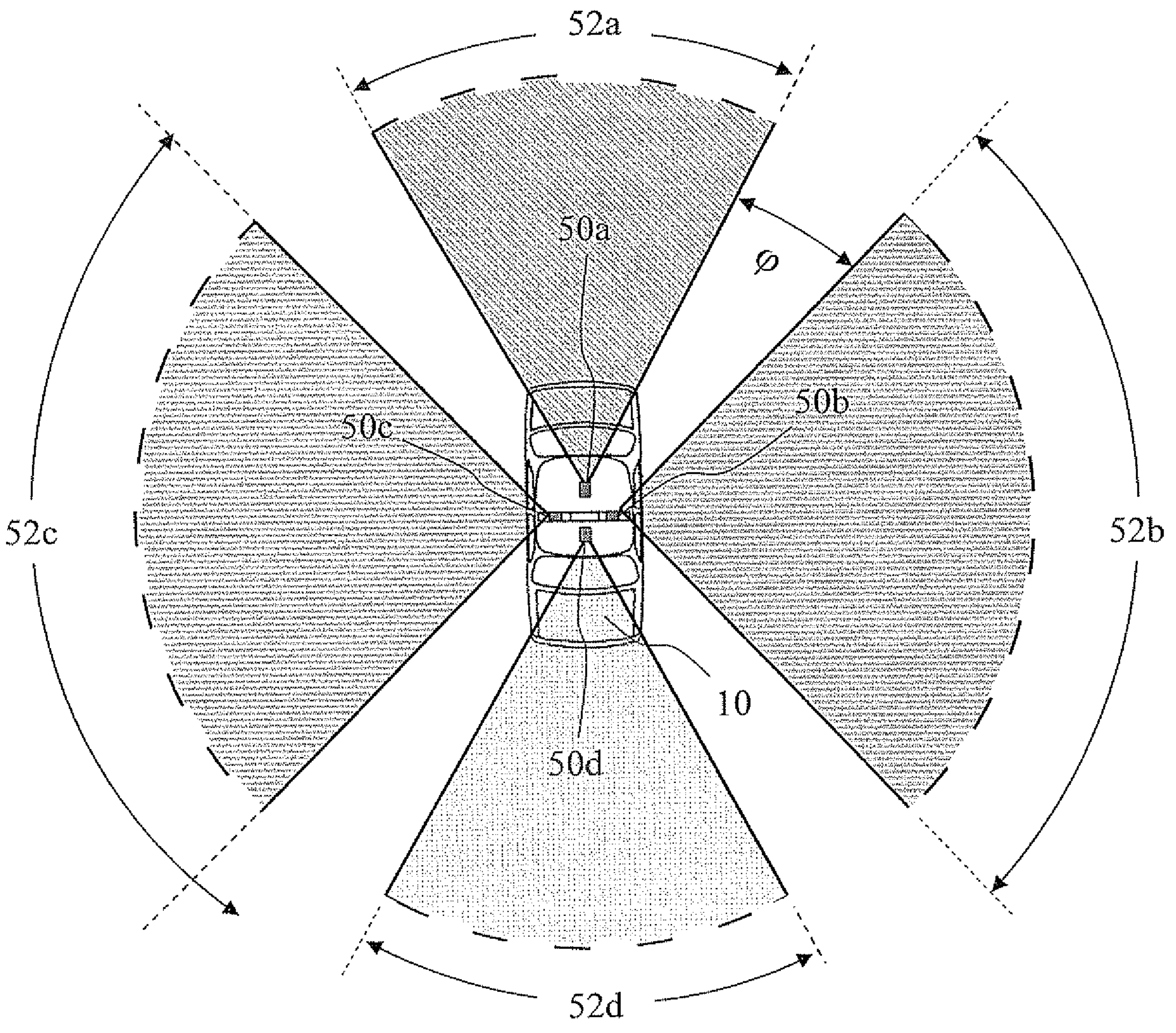
FIG. 6 is a top view illustration of an exemplary embodiment of a traffic law violation detection and recording system of the present invention configured with a law enforcement host vehicle and a four wide angle cameras in a non-concentric configuration, with diverging blind zones.

Reference is now made to FIG. 6, which is a top view of an embodiment of a traffic law violation detection and recording system 100 of the present invention, configured with a law enforcement host vehicle 10 and four wide angle cameras 50 in a non-concentric configuration. The FOV of the left and right looking cameras 50*b* and 50*e* are considerably wider than the front and back looking cameras and each viewing zone 52 is separated from a neighboring viewing zone 52 by a diverging blind zone 53, having an angle φ, which at some distances, may cause a target vehicle not to be seen by at least one camera 50.

Figure 7:
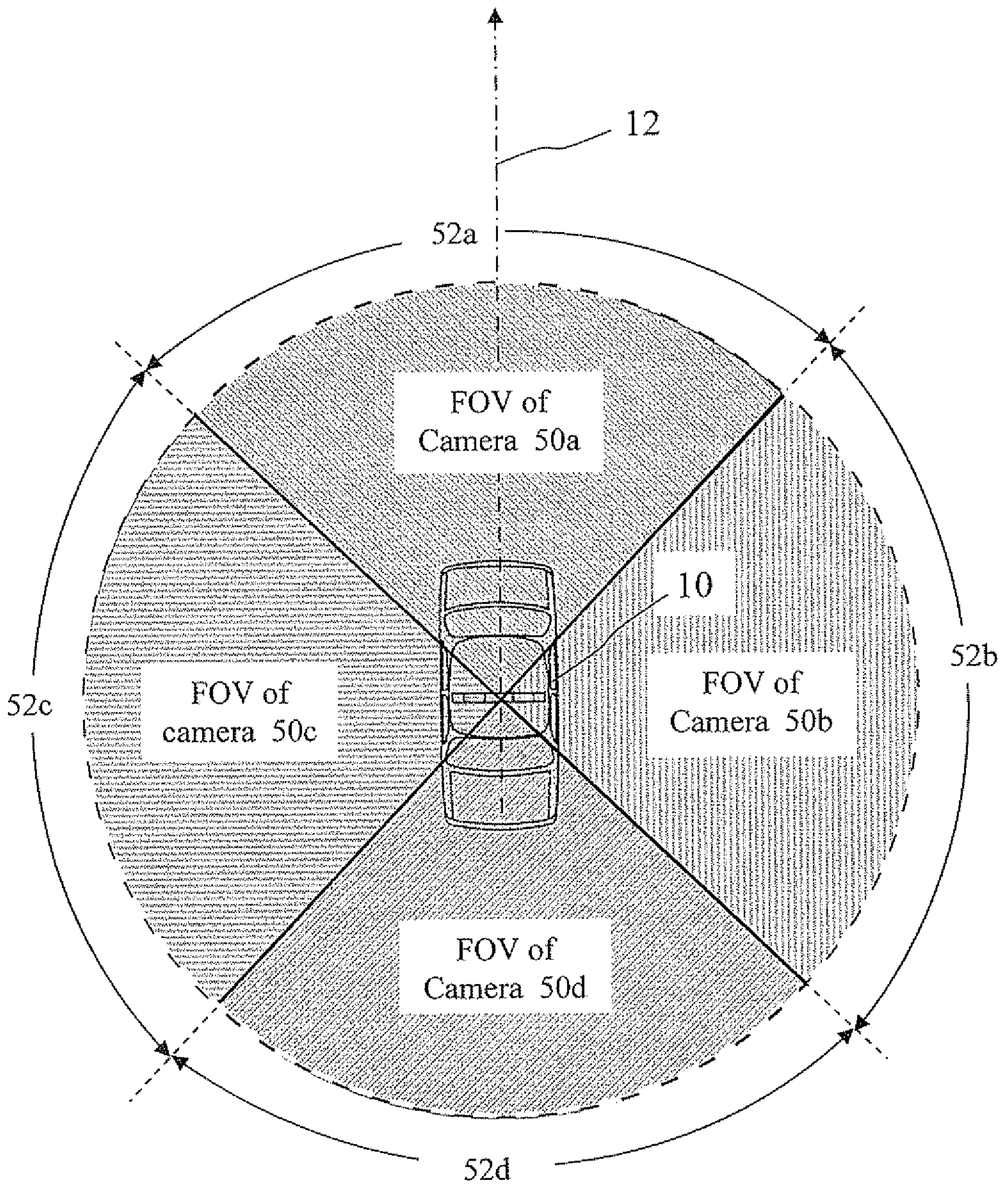
FIG. 7 is a top view illustration of an exemplary embodiment of a traffic law violation detection and recording system wherein each camera has a 90° FOV, wherein each viewing zone is substantially tangential to a neighboring viewing zone.
Figure 8:
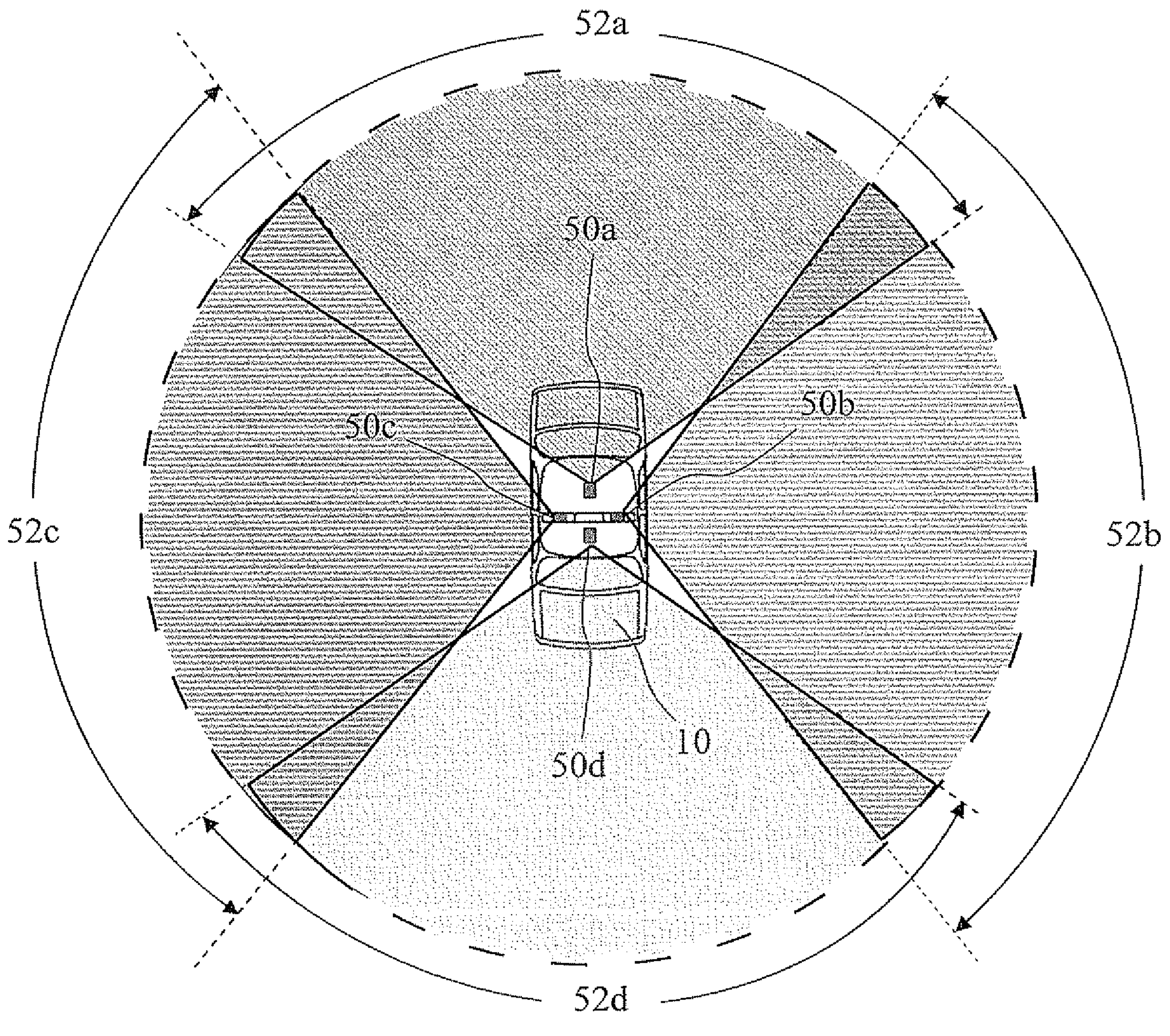
FIG. 8 is a top view illustration of an exemplary embodiment of a traffic law violation detection and recording system of the present invention in a non-concentric configuration, showing the viewing zones viewed by each camera, with converging blind zones near the host vehicle and with some overlap further away from the host vehicle.
Figure 9:
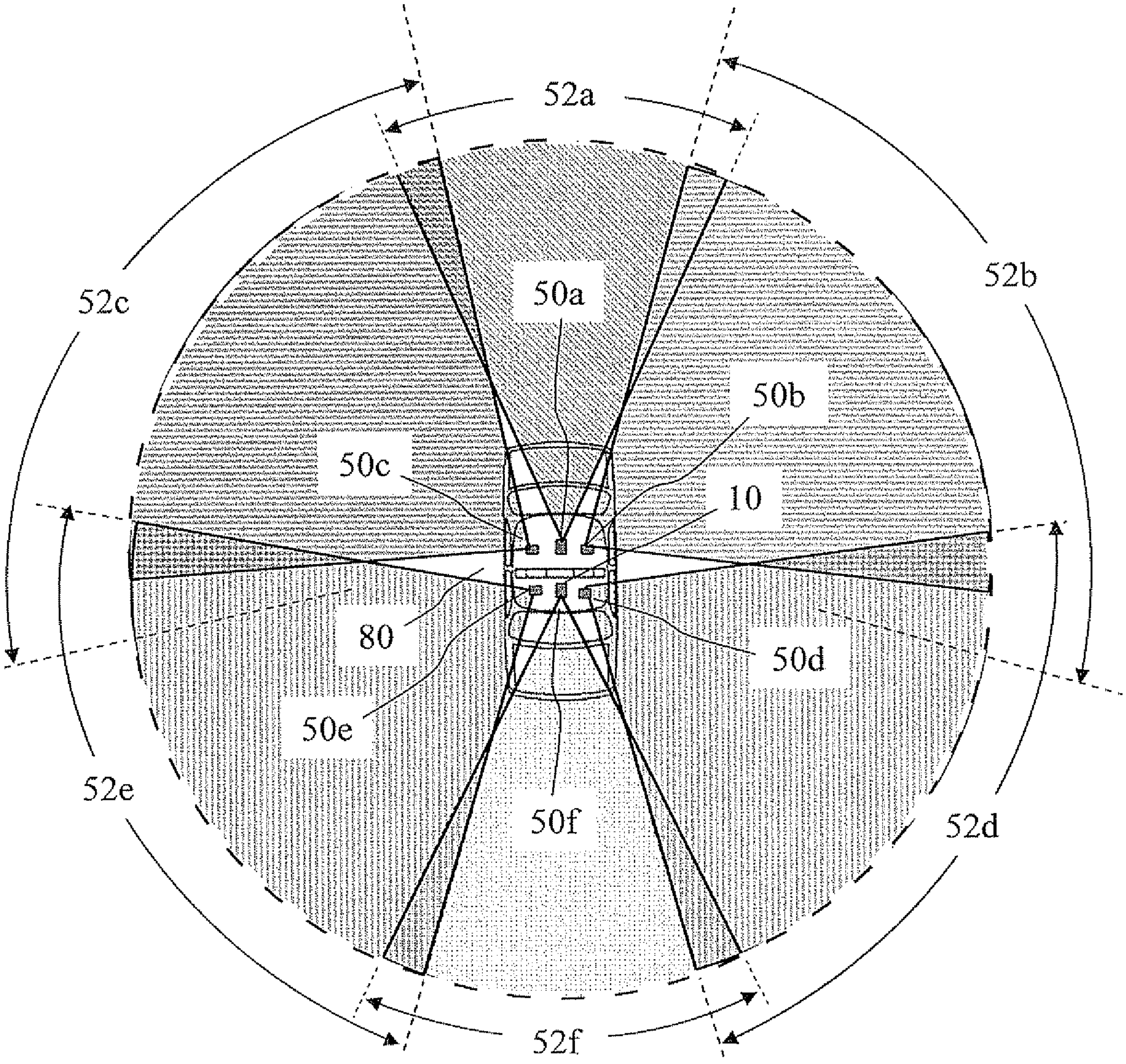
FIG. 9 is a top view illustration of an exemplary embodiment of a traffic law violation detection and recording system of the present invention configured with a law enforcement host vehicle and a six wide angle cameras system.

Reference is now made to FIG. 7, which is a top view illustration of an embodiment of a traffic law violation detection and recording system 100 of the present invention configured with a law enforcement host vehicle 10 and a four wide angle cameras 50 in a concentric configuration, showing viewing zones 52 viewed by each camera 50, wherein each viewing zone 52 is substantially tangential to a neighboring viewing zone 52. Reference is also made to FIG. 8, which is a top view illustration of an embodiment of a traffic law violation detection and recording system 100 of the present invention configured with a law enforcement host vehicle 10 and a four wide angle cameras 50 in a non-concentric configuration, showing viewing zones 52 viewed by each camera 50, wherein each camera 50 has a FOV larger than 90°, wherein each viewing zone 52 is separated from a neighboring viewing zone 52 by a converging blind zone near host vehicle 10 and with some overlap further away from the host vehicle 10. In the embodiment shown in FIGS. 7 and 8, the wide FOV of cameras 50*a* and 50*d* limit the distance at which a target vehicle is detected. To enlarge the distance at which a target vehicle can be detected a six camera system is embodied, whereas cameras 50*a* and 50*d* have a narrower FOV. FIG. 9 is a top view illustration of an example embodiment of a traffic law violation detection and recording system 100 of the present invention configured with a law enforcement host vehicle 10 and a six wide angle cameras 50 system in a non-concentric configuration, showing viewing zones 52 viewed by each camera 50, wherein each camera 50 has a FOV smaller than 90°, and wherein each viewing zone 52 is separated from a neighboring viewing zone 52 by a converging blind zone near the host vehicle 10 and with some overlap further away from the host vehicle 10. Viewing zones 52*a* and 52*f* viewed respectively by the front and back looking cameras 50*a* and 50*f* are considerably narrower than viewing zones 52*b*, 52*c*, 52*d*, and 52*a* the left and right looking cameras 50*b*, 50*c*, 50*d*, and 50*c*, thereby enabling cameras 50*a* and 50*f* to detect a target vehicle at distance which is considerably larger then the distance at which cameras 50*a* and 50*d* of system 100 shown in FIGS. 7 and 8, can detect a target vehicle. For example: referring to system 100 shown in FIG. 9, cameras 50*a* and 50*f* have a FOV of 50°, enabling to detect a target vehicle at distances up to about 50 meters away. Cameras 50*b*, 50*c*, 50*d*, and 50*c* have a FOV of 80°, enabling to track vehicles and record video evidence of traffic law violation at sufficient resolution.

It should be noted the FOV angles of the various cameras 50, are given by way of example only. Specifically, referring back to FIGS. 3, 4, 5, 6 and 9, the FOV of the left and right looking cameras 50 are not necessarily wider than the front and back looking cameras 50, and referring back to FIG. 8, the FOV of front and rear looking cameras may be less then 90°, and FOV of the left and right looking cameras may be wider the 90°.

It is noted that dedicated right and left looking cameras allow the detection system to track the progress of a vehicle from a position behind the host vehicle, around to the side and finally in front of the host vehicle. The traffic violation detection system can assess that the same vehicle passed from the back to the front of the host vehicle, as there is provided an unbroken line of sight with the offending vehicle. This is not true for systems with only forward and backward looking cameras. In addition, having a right and left looking camera improves the accuracy of determining the relative distance between vehicles, a process that is severely impaired when lacking side looking cameras.

Figure 10:
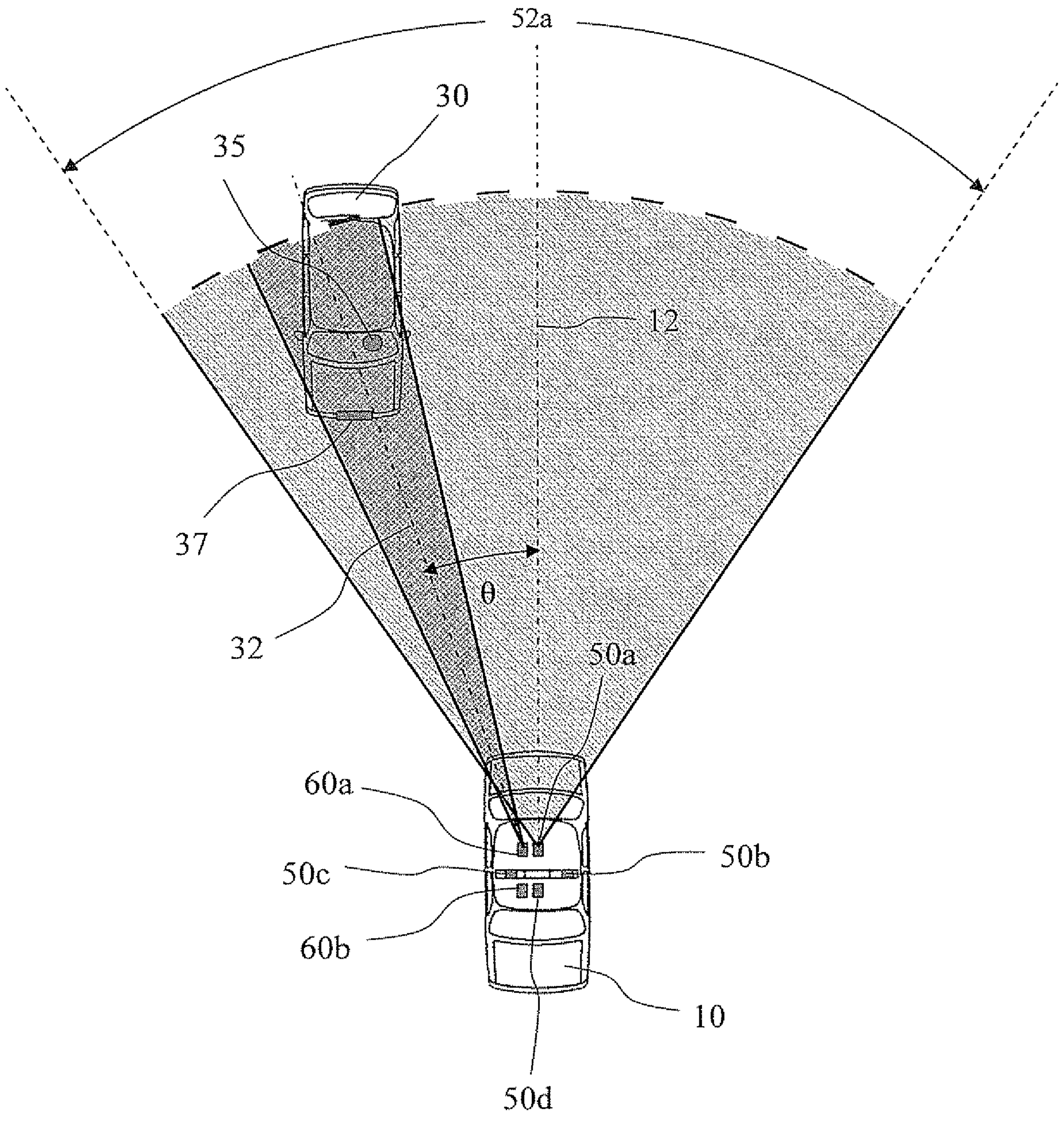
FIG. 10 is a top view illustration of a traffic law violation detection and recording system of the present invention showing an example of a viewing zone viewed by a wide angle camera.
Figure 11:
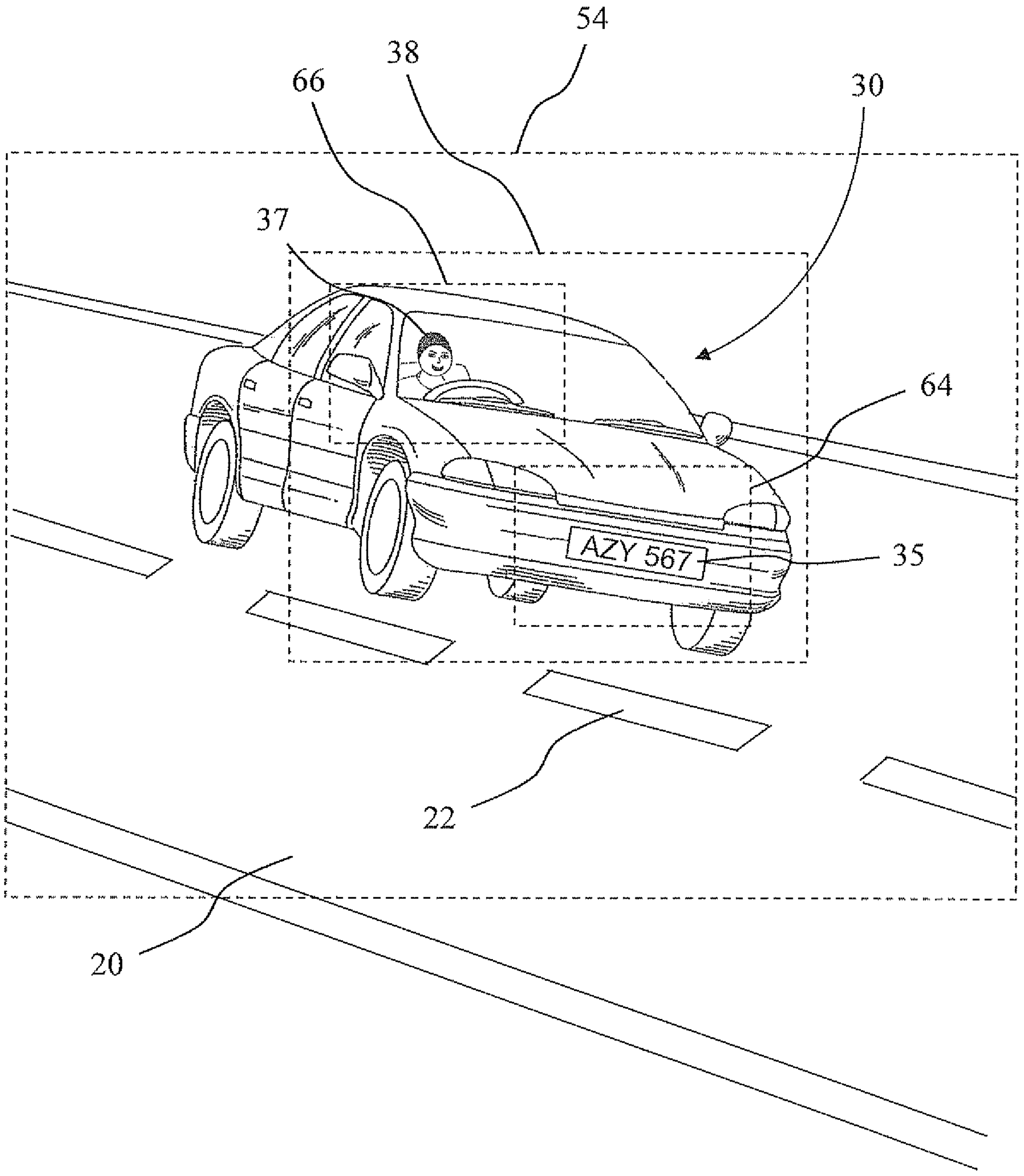
FIG. 11 is a perspective view illustration of an embodiment of an exemplary target vehicle and examples of ROIs to be recorded when a traffic law violation event is detected.

Reference is now made to FIG. 10, which is a top view illustration of a traffic law violation detection and recording system 100 of the present invention showing an example of a viewing zone 52*a* viewed by a wide angle camera 50*a*, having a target vehicle 30 within viewing zone 52*a* and a corresponding narrow angle camera 60*a* aligned to view and acquire images of regions of interests (ROIs) of target vehicle 30. When target vehicle 30 is detected in viewing zone 52*a*, one or more ROIs are identified in the image frames acquired by camera 50*a*. Camera 60*a* is then directed to a selected ROI (towards direction of directional line 32) to acquire a close-up image of the selected ROI. Reference is also made to FIG. 11, which is a perspective view illustration of an embodiment of an example target vehicle 30 and examples of ROIs 64 and 66 and 38 to be recorded when a traffic law violation event is detected. An ROI, which can help identify the traffic law violator, is selected from a group of regions in an image frame 54, acquired by a camera 50, the group including regions containing identifying objects (hereinafter refer to as "ID objects") license plate 35 of vehicle 30, driver 37 of vehicle 30, close-up image 38 of vehicle 30 and/or any feature that can be selected. Other data that provide identification or evidentiary information of the traffic violation event can also be found in frame 54, such as the make of vehicle 30, the position of vehicle 30 on road 20 relative to lane markings 22 etc.

While cameras 50 are typically affixed to host vehicle 10 and all parameters are fixed and known (from a one time calibration procedure), cameras 60 can typically move in the PAN (θ) and TILT directions, such that they can be quickly aimed to acquire a close-up image of the selected ROI. Employing various optical techniques to replace or enhance the currently described system is envisioned. Such optical techniques can include, in a non-limiting example, a mobile array of mirrors. Cameras 60 have typically a very narrow FOV and a large PAN moving range typically enables to acquire a close-up image of all or most of the FOV of a corresponding wide angle camera 50. Potentially cameras 60 are only configured to PAN but not TILT. Camera 60*a* is able to acquire a close-up image of all or almost all of the FOV of camera 50*a*. Camera 60*b* is able to acquire a close-up image of all or almost all of the FOV of camera 50*b*.

Cameras 50 are typically operationally coupled to cameras 60 as so camera 50 grabs an image at substantially the same time as the corresponding camera 60 grabs an image. Combining a close-up image taken by camera 60 with a wide field of view image taken by camera 50 at substantially the same time, resembles a wide field of view image with very high resolution at a small ROI.

Example:

Camera 50*a* has a FOV of 53°. Camera 50*a* resolution acquires images having 768 columns, which enables reading of the license plate number from a distance of 1-7 meters away.

Camera 60*a* has a FOV of 7.4° and can move horizontally ±18° (θ=18°). Camera 60*a* resolution acquires images having 768 columns, which enables identifying in license plate from a distance of 7-50 meters away.

Thereby, in system 100 of this example, a license plate can be read within a range of 1-50 meters away from cameras 50*a* and 60*a*.

Methods of the Present Invention

Figure 12:
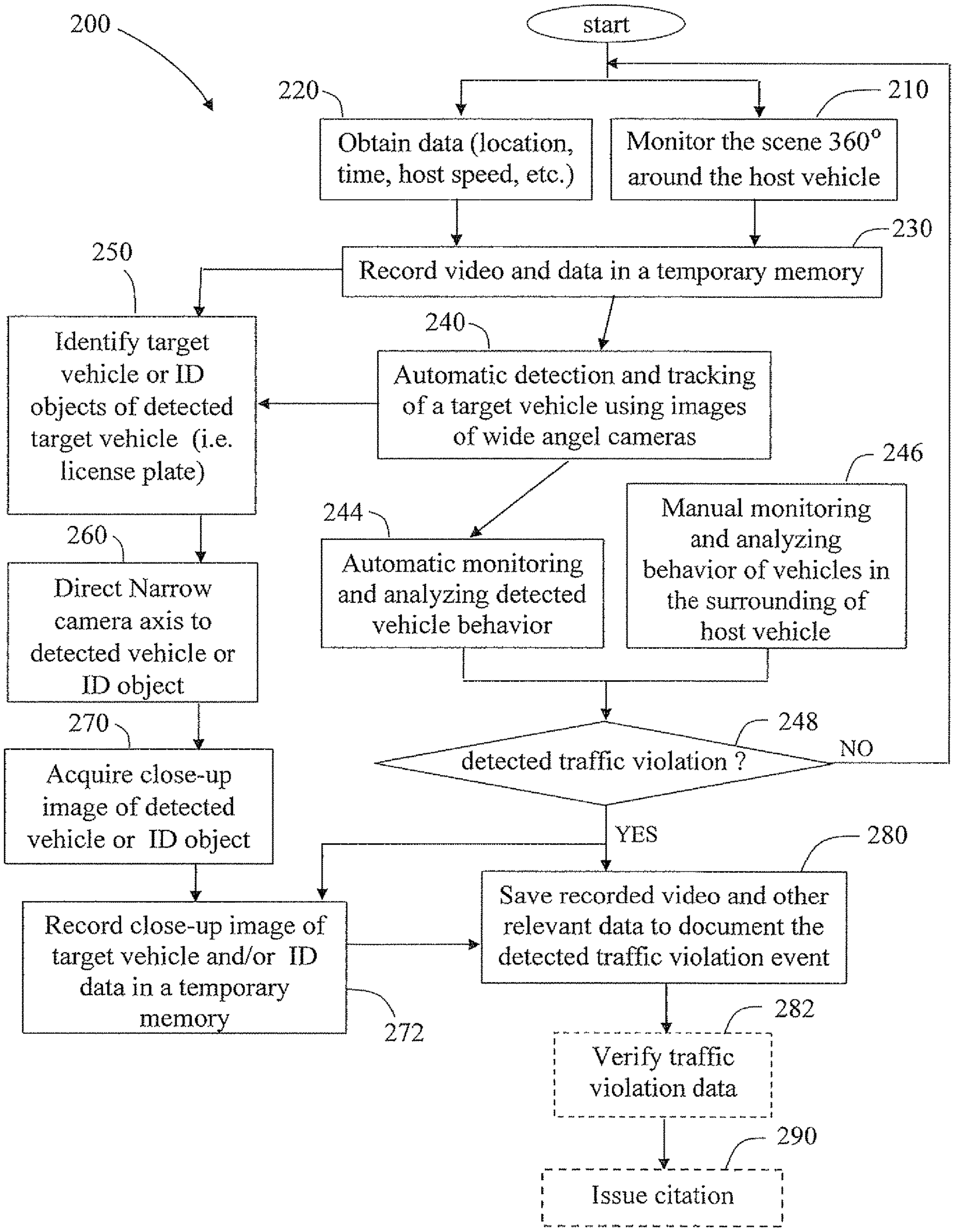
FIG. 12 is a schematic flow diagram of a method for detecting a traffic law violation event, according to embodiments of the present invention.

Referring back to FIGS. 3-9 and 11, and also referring to FIG. 12, which is a schematic flow diagram of a method 200 for detecting and recording a traffic law violation event, by a traffic law violation detection and recording system 100 mounted on a host vehicle 10, according to embodiments of the present invention. In method 200, traffic law violation detection and recording system 100 starts monitoring the scene in an angle 360° horizontally around vehicle 10 (step 210) with N wide angle cameras 50. Typically, system 100 also acquires available relevant data (step 220) such as the speed of host vehicle 10 (for example from the CAN bus of host vehicle 10), the geographical location of host vehicle 10 and time (for example from a GPS), and other available relevant data. System 100 continuously records video image frames from N wide cameras 50 into a temporary memory (step 230), keeping video back for several seconds, depending on the memory size and predefined buffer size selection.

Upon the entering of a target vehicle 30 and/or a pedestrian and/or any other object (hereinafter referred to as "object 30") into a zone 52 viewed by a camera 50, object 30 is detected automatically by system processor 120 (step 240). The behavior of object 30 is then respectively analyzed either automatically by system processor 120 (step 244), or manually by the operator of system 100 (step 246) if not analyzed automatically in step 240. If no traffic law violation is detected, system 100 proceeds monitoring the scene around host vehicle 10. While monitoring a detected object 30, system 100 proceeds with the following steps of method 200:

Step 250: identifying ID objects in an image frame 54 containing object 30, detected in step 240.
- System processor 120 detects one or more ROIs in an image frame 54 containing object 30, detected in step 240.

Step 260: Direct a corresponding narrow angle camera 60 to one or more ROIs identified in step 250.
- System processor 120 directs a narrow angle camera 60 to each of the ROIs identified in step 250.

Step 270: acquire one or more image frames of ROI identified in step 250.
- System processor 120 acquires one or more image frames of each ROI identified in step 250 using a selected narrow angle camera 60.

Step 272: record the acquired image frames of each identified ID in a temporary memory.
- System processor 120 record the acquired image frames of each identified ID in a temporary memory.

Step 248: A traffic law violation event is detected.
- System processor 120, or an operator of system 100, detects a traffic law violation event.

Step 280: Save recorded video and other relevant data to document the detected traffic violation event.
- System processor 120 saves the acquired image frames that were recorded in step 230, ID data or close-up images of each ROI identified in step 250, and other relevant data to document the detected traffic violation event, that was kept in temporary memory (step 230), for future use, for example, for issuing and handling a citation.

Step 282: Verify traffic violation event data.
- Optionally, system processor 120 or an operator of system 100, verify the validity of the traffic violation event data obtained. For example, verifying that the obtained data has sufficient evidence to issue a citation.

Step 290: Issue a citation.
- Optionally, issue a traffic citation based on the traffic violation event data obtained and recorded.

Figure 13:
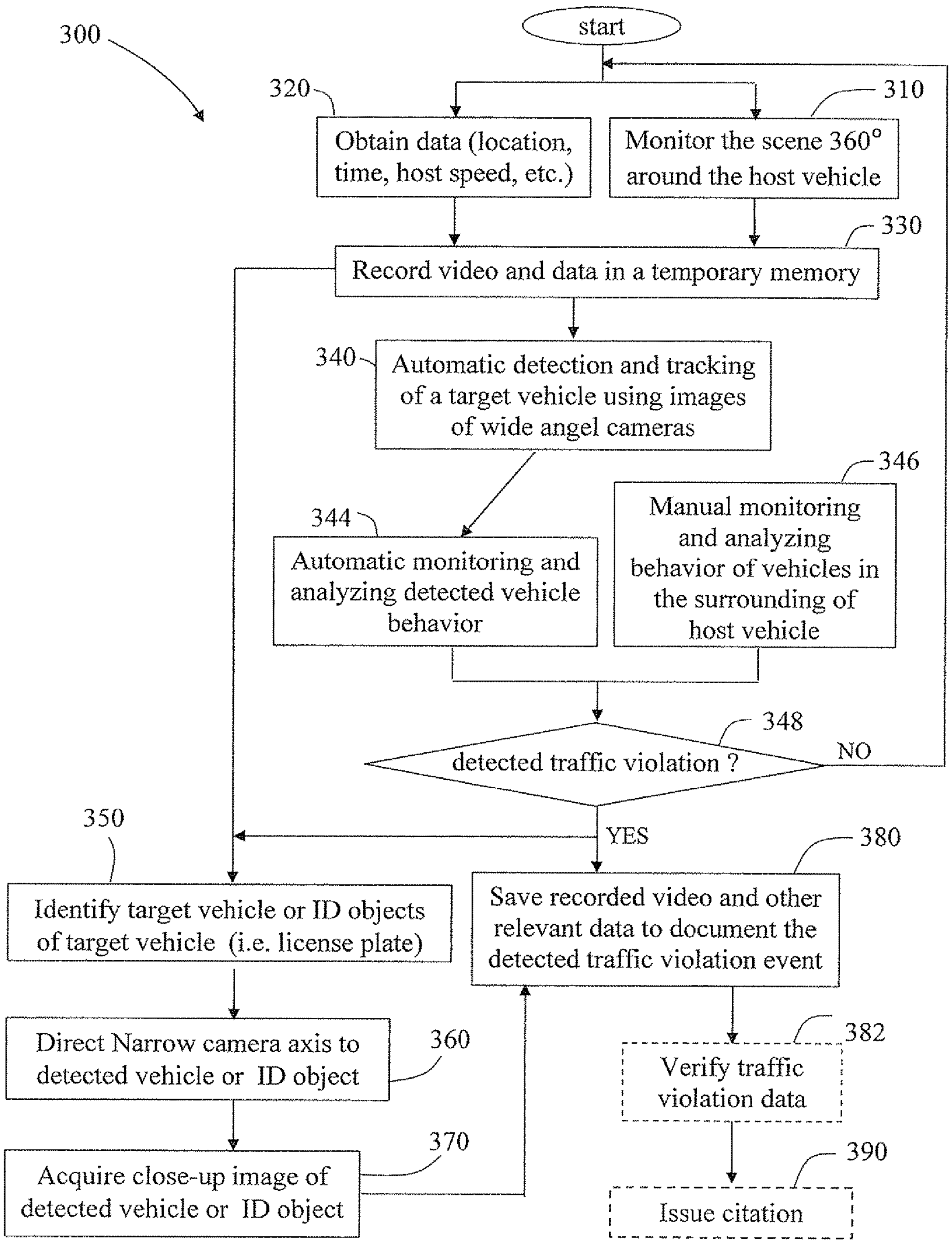
FIG. 13 is a schematic flow diagram of another method for detecting a traffic law violation event, according to embodiments of the present invention.

Referring back to FIGS. 3-9 and 11, and also referring to FIG. 13, which is a schematic flow diagram of another method of the present invention, method 300 for detecting and recording a traffic law violation event, by a traffic law violation detection and recording system 100 mounted on a host vehicle 10, according to embodiments of the present invention. In method 300, when vehicle 10 is operated, traffic law violation detection and recording system 100 starts monitoring the scene in an angle 360° horizontally around vehicle 10 (step 310) with N wide angle cameras 50. Typically, system 100 also acquires available relevant data (step 320) such as the speed of host vehicle 10 (for example from the CAN bus of host vehicle 10), the geographical location of host vehicle 10 and time (for example from a GPS), and other available relevant data. System 100 continuously records video image frames into a temporary memory (step 330), keeping video back for several minutes, depending on the memory size and predefined buffer size selection.

Upon the entering of a target vehicle 30 and/or a pedestrian and/or any other object (hereinafter refer to as "object 30") into a zone 52 viewed by a camera 50, object 30 is detected automatically by system processor 120 (step 340). The behavior of object 30 is then respectively analyzed either automatically by system processor 120 (step 344), or manually by the operator of system 100 (step 346), if not analyzed automatically in step 340. If no traffic law violation is detected, system 100 proceeds monitoring the scene around host vehicle 10. System 100 proceeds with the following steps of method 300:

Step 348: A traffic law violation event is detected.
- System processor 120, or an operator of system 100, detects a traffic law violation event.

Step 350: identifying ID objects in an image frame 54 containing object 30, detected in step 340.
- System processor 120 detects one or more ROIs in an image frame 54 containing object 30, detected in step 340.

Step 360: Direct a corresponding narrow angle camera 60 to one or more ROIs identified in step 350.
- System processor 120 or direct narrow angle camera 60 to each of the ROIs detected in step 350.

Step 370: acquire one or more image frames of each ROI identified in step 350.

System processor 120 or an operator of system 100, acquire one or more image frames of each ROI detected in step 350 using a selected narrow angle camera 60.

Step 380: Save recorded video and other relevant data to document the detected traffic violation event.

System processor 120 saves the acquired image frames that were recorded in step 330, acquired image frames of each identified ID and other relevant data to document the detected traffic violation event, that was kept in temporary memory, for future use, for example, for issuing and handling a citation.

Step 382: Verify traffic violation event data.

Optionally, system processor 120 or an operator of system 100, verify the validity of the traffic violation event data obtained. For example, verifying that the obtained data has sufficient evidence to issue a citation.

Step 390: Issue a citation.

Optionally, issue a traffic citation based on the traffic violation event data obtained and recorded.

For the sake of clarity, it should be noted that traffic law violation detection and recording system 100 may include any number of wide angle cameras 50 and any number of narrow angle cameras 60. It should further be noted that adjacent viewing zones 52 may be overlapping, tangential or separated by a gap. For the sake of clarity, it should be noted that traffic law violation detection and recording system 100 may be mounted on any vehicle, not necessarily on a law enforcing vehicle. Various other permanent and transportable law enforcement units are envisioned.

Tracking of a detected object 30 can be done automatically by system processor 120. When a monitored object 30 departs from an image frame 54 provided by a camera 50 and enters image frame 54 of the next neighboring camera 50, monitoring of detected object 30 will then proceed using the second image sensor 50.

Traffic law violation detection and recording system 100 may further include a control unit, including a control panel, to enable an operator to operate system 100. An operator will be able to power up and down system 100. An operator may be able to have a button for each or selected traffic laws to classify a detected traffic law violation event. An operator may be able to notify a remote center on a detection of a traffic law violation event. The control unit may include any other feature, such as buttons, lights, switches and the like, for any other functional feature of system 100.

In embodiments of the present invention, traffic law violation detection and recording system 100 includes cameras with zoom-in capabilities, thereby the capabilities of a wide angle camera 50 and the capabilities of a narrow angle camera 60 are integrated in the current embodiments into a single camera.

In embodiments of the present invention, traffic law violation detection and recording system 100 includes wide angle cameras 50 having very high resolution thereby no narrow angle cameras 60 are required. Referring back to FIG. 6, cameras 50*a*, 50*d* have a wide FOV and high resolution that allows identification of ID objects (such as the reading of a license plate number) in the image of target vehicles up to 30 meters away. For example, cameras 50*a*, 50*d* have 3500 columns and a 53° FOV, which allow reading a license plate from up to 30 meters away. Another example: two camera replace one or more wide angle camera 50 have 2000 columns and 30° FOV, mounted side by side, combining to a total FOV of 60°, and enabling reading a license plate number from up to 30 meters away.

Traffic violation detection and recording system 100 employs algorithms known in the art for the detection of traffic violations using image processing. Additional, innovative algorithms are detailed below.

Traffic Violation Rules

Illegal Lane Change Detection

Traffic violation detection and recording system 100 detects and tracks vehicles using front and/or back looking cameras 50 by means of image processing. The system also detects road surface markings that may not be crossed (such as a solid line) according to the country laws in front and/or back looking cameras 50 by means of image processing. For the purposes of this document, the term "solid line" refers to any type of road marking which denotes the illegality of a vehicle crossing such line.

Let I be an image received from a front or back looking camera 50. Let x1 be the horizontal coordinate of the leftmost pixel that was detected as being part of detected vehicle in image I. Let x2 be the horizontal coordinate of the rightmost pixel that was detected as being part of detected vehicle in image I. Let y be the vertical coordinate of the lowest pixel that was detected as being part of detected vehicle in image I. Let x be the horizontal coordinate at which a detected road surface marking that may not be crossed passes through raw y of image I. An automatic detection of traffic law violation is declared when the relation between x, x1, x2 is: $x1<x<x2$.

Changing Lane Without Turning on the Turn Signals

Traffic violation detection and recording system 100 detects and tracks vehicles using front and/or back looking cameras 50 by means of image processing. For each tracked vehicle, the system also detects blinking lights at the area of the detected vehicle in a sequence of images. In a case where blinking lights are detected at time t, then s(t)=1. Otherwise s(t)=0. System 100 also detects and tracks lane separation markings using front and/or back looking cameras 50 by means of image processing.

Let I(t) be an image received from a front or back looking camera 50 at time t. Let x1(t) be the horizontal coordinate of the leftmost pixel that was detected as being part of detected vehicle in image I(t). Let x2(t) be the horizontal coordinate of the rightmost pixel that was detected as being part of detected vehicle in image I(t). Let y(t) be the vertical coordinate of the lowest pixel that was detected as being part of detected vehicle in image I(t). Let x(t) be the horizontal coordinate at which a detected lane separation marking passes through raw y(t) of image I(t).

For each detected vehicle, the system stores in memory x1(t),x2(t),x(t) and s(t) for every t in the past several seconds.

An automatic detection of traffic law violation is declared when system 100 finds t0, t1, such that t0>t1 and one of the following relations is true:

1) $x1(t0)<x(t0)<x2(t0)$ and $x2(t1)<x(t1)$ and s(t)=1 for every t s.t. $t0>=t>=t1$.

2) $x1(t0)<x(t0)<x2(t0)$ and $x1(t1)>x(t1)$ and s(t)=1 for every t s.t. $t0>=t>=t1$.

3) $x2(t0)<x(t0)$ and $x1(t1)>x(t1)$ and s(t)=1 for every t s.t. $t0>=t>=t1$.

4) $x1(t0)>x(t0)$ and $x2(t1)<x(t1)$ and s(t)=1 for every t s.t. $t0>=t>=t1$.

Passing a Second Vehicle on the Wrong Side

Method a: Traffic violation detection and recording system 100 searches for target vehicle in images from backward looking wide angle camera 50 that views the area behind the host vehicle. When a target vehicle 30 is detected, system 100 temporarily stores recorded identification features of target vehicle 30, and tracks target vehicle 30 or part thereof on subsequence images from the same camera. If the vehicle tracking indicates that part of the vehicle or the entire vehicle moves towards the right side of host vehicle 10, then in the next few seconds, and for no more than 10 seconds, the system searches in images from the right-pointing camera 60 for objects with identification features that exist in the target vehicle. When such features are found, the system tracks the target vehicle or part thereof in subsequence images that are received from the right-pointing camera. If the vehicle tracking indicates that the target vehicle moves forward relative to host vehicle 10, until parts of the target vehicle 30 are going out of the field of view of right looking camera 60 towards the front of the target vehicle (e.g. if right-looking camera is mounted in normal orientation, and no image-flipping or mirroring is done, then the target vehicle will go out of the left side of the images), then in the next few seconds, and for no more than 10 seconds, the system searches in images from the forward-pointing camera 60 for objects with identification features that exist in the target vehicle. When such features are found, then an automatic detection of traffic law violation is declared. A citation can be issued locally by citation issuing unit 150 or a message can be sent to a remote citation issuing unit.

Method b: Traffic violation detection and recording system 100 searches for a target vehicle 30 in images recorded by right-pointing camera 50. If a target vehicle is detected in the edge of FOV that is closer to the back side of host vehicle 10, then target vehicle 30 is tracked in subsequence images. If in a sequence of images the tracked target vehicle moves constantly towards the side of the image that is closer to the front of the host vehicle (e.g. if right-looking camera is mounted in normal orientation, and no image-flipping or mirroring is done, then this is the left side of the image), and system 100 calculates that the back part of the target vehicle is in front of a predefined position of the host vehicle, then an automatic detection of traffic law violation is declared. A citation can be issued locally by citation issuing unit 150 or a message can be sent to a remote citation issuing unit.

Method c: When an image is received from right-pointing camera 60, system 100 searches the edge of the FOV that is closer to the back side of the host vehicle for image features (e.g. feature points, feature lines, etc.) of a vehicle. In subsequent images the system tracks the image features that move towards the side of the field of view of the camera that is closer to the front of the host vehicle 10 (e.g. if right-looking camera is mounted in normal orientation, and no image-flipping or mirroring is done, then this is the left side of the image). If several of the tracked image features reach the edge of the FOV of the camera that is closer to the front of host vehicle 10, then an automatic detection of traffic law violation is declared. A citation can be issued locally by citation issuing unit 150 or a message can be sent to a remote citation issuing unit.

The description of methods a, b and c are suitable for detection of vehicles that are passing from the right. Where the local rules forbids passing from the left, the same methods can be used for detection of vehicles that are passing from the left using the appropriate cameras.

Tailgating Host Vehicle

Traffic violation detection and recording system 100 detects and tracks target vehicle 30 in images from the camera that views the area behind the host vehicle. For every image, the systems calculates the speed of host vehicle 10 at the time that the image was recorded (e.g. by inputs from the vehicle systems, or by GPS data, or by other means) and the minimum distance L that a following target vehicle 30 must legally keep from the host vehicle 10 at that speed according to local traffic laws. For every image in which the target vehicle is apparent, the system measures (by means of image processing and/or other distance sensors) the distance D between the back of host vehicle 10 and the front of target vehicle 30. System 100 calculates a margin value E that incorporates the maximum accuracy error in the calculation of L, the maximum accuracy error in the calculation of D, and additional margin as required. If $L-E>D$ then an automatic detection of traffic law violation is declared.

The foregoing is considered as illustrative only of the principles of the invention. Further, since numerous modifications and changes will readily occur to those skilled in the art, it is not desired to limit the invention to the exact design and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. A system mountable in a host vehicle, the system comprising:

at least four cameras: a left-looking camera, a right-looking camera, a forward-looking camera and a backward-looking camera, wherein fields-of-view of the left and right looking cameras are substantially wider than fields-of-view of the forward-looking and backward-looking cameras; wherein the fields-of-view of the left-looking camera, the right-looking camera, the forward-looking camera and the backward-looking camera are horizontal angular extents of respective scenes, as imaged onto respective image sensors of the cameras;

a processor configured to operationally control said cameras to acquire and store in memory a plurality of images acquired by said cameras when mounted in the host vehicle, wherein the images stored in said memory acquired from at least one of the forward-looking camera and the backward-looking camera are used for identification of a license plate of a target vehicle, wherein the images stored in said memory acquired from at least one of the left-looking camera and the right-looking camera are used for tracking the progress of the target vehicle while continuously recording a traffic law violation by the target vehicle between positions behind the host vehicle, along side the host vehicle and in front of the host vehicle.

2. The system of claim 1, wherein said at least four cameras are positioned to provide at least 360° total field of view horizontally around the host vehicle of the fields-of-view combined of said at least four cameras.

3. The system of claim 2, wherein said cameras are fixedly mountable on the vehicle.

4. The system of claim 1 further comprising:

a permanent storage unit for permanently storing said captured images.

5. The system of claim 1, wherein during operation of the system said processor is programmed to identify at least one imaged identification feature of an object viewed by at least one of said at least four cameras, wherein said at least one imaged identification feature is selected from the group consisting of:

a license plate;

a vehicle model;

a vehicle color; and a face.

6. The system of claim 5, further comprising:

at least one narrow field-of-view camera, wherein the field-of-view of said narrow field-of-view camera is substantially less than smaller field-of-view of the forward-looking and backward-looking cameras, wherein said at least one narrow field-of-view camera is operationally coupled to said processor, wherein under control of said processor said at least one narrow field-of-view camera is operable to rotate horizontally in order to view said object.

7. The system of claim 6, wherein at least one of said cameras is operationally coupled to said at least one narrow field-of-view camera, and configured to provide a wide field of view image from said at least one camera for every narrow field-of-view image from said narrow field-of-view camera, wherein said wide field-of-view image is captured at substantially the same time as said narrow field-of-view image.

8. The system of claim 1, further comprising:

a recording unit, operatively attached to said processor, wherein said recording unit is configured to record at least one datum, selected from the group consisting of:

current speed of the host vehicle;

geographical location of the host vehicle;

current date; and current time.

9. The system of claim 1, wherein said processor further includes:

a citation unit operable to report a law violation.

10. The system of claim 1, wherein said processor is configured to acquire images from the respective cameras with a time delay of less than twenty milliseconds.

11. The system of claim 1, further comprising:

a button configured for use by an operator in the host vehicle to perform at least one operation selected from the group consisting of: signal a traffic law violation event, classify a traffic law violation event, save images to document a traffic violation event and notify a remote center with respect to a traffic law violation event.

12. The system claim 1, further comprising: a memory configured to buffer images for a period of time from before a traffic law violation is detected to enable issuance of a traffic citation based on the buffered images.

13. A method comprising:

acquiring a plurality of images around a host vehicle from at least four cameras mounted in the host vehicle: a left-looking camera, a right-looking camera, a forward-looking camera and a backward-looking camera, wherein fields-of-view of the left and right looking cameras are substantially wider than fields-of-view of the forward-looking and backward-looking cameras; wherein the fields-of-view of the left-looking camera, the right-looking camera, the forward-looking camera and the backward-looking camera are horizontal angular extents of respective scenes, as imaged onto respective image sensors of the cameras;

recording said images from said cameras by a recording unit;

monitoring horizontally around the host vehicle with said at least four cameras;

detecting a target vehicle in the field-of-view of at least one of said at least four cameras;

storing images acquired from at least one of the forward-looking camera and the backward-looking camera for identification of a license plate of a target vehicle; and storing images acquired from at least one of the left-looking camera and the right-looking camera for tracking the progress of the target vehicle for continuous recording of a traffic law violation by the target vehicle between positions behind the host vehicle, along side the host vehicle and in front of the host vehicle.

14. The method of claim 13 further comprising:

programming a processor to identify an imaged identification feature of the target vehicle, wherein the imaged identification feature is selected from the group consisting of: the license plate of the target vehicle, the color of the target vehicle and the model of the target vehicle.

15. The method of claim 14 further comprising:

storing said imaged identification feature for subsequent identification of the target vehicle.

16. The method of claim 14, further comprising:

analyzing the images of the target vehicle thereby recognizing a traffic law violation performed by a driver of the target vehicle, wherein the traffic law violation is selected from the group consisting of:

changing lanes over a solid line lane marker;

changing of lanes without signaling;

illegally overtaking the host vehicle; and tailgating the host vehicle.

17. The method of claim 13 further comprising: enabling buffering of images for a period of time starting before a traffic law violation is detected; and enabling issuance of a traffic citation based on the buffered images.

18. A system mountable in a vehicle, wherein the system includes:

at least four cameras mounted in the host vehicle;

a left-looking camera, a right looking camera, a forward-looking camera and a backward looking camera, wherein fields-of-view of the left and right looking cameras are substantially wider than fields-of-view of the forward-looking and backward-looking cameras, wherein the system is configured to perform the method of claim 13.

* * * * *